United States Patent [19]

Barber et al.

[11] Patent Number: 4,713,936

[45] Date of Patent: Dec. 22, 1987

[54] MOTOR SEAL PROTECTOR VALVE

[75] Inventors: Dennis R. Barber, Waterloo; Larry M. Delfs, Cedar Falls; Ronnie F. Burk, Waterloo, all of Iowa

[73] Assignee: Deere & Company, Moline, Ill.

[21] Appl. No.: 799,057

[22] Filed: Nov. 18, 1985

[51] Int. Cl.⁴ .................... F15B 13/042; F16K 21/04

[52] U.S. Cl. .................................... 60/403; 60/459; 91/421; 91/426

[58] Field of Search ................ 60/403, 406, 468, 459; 91/445, 444, 421, 426, 264, 448; 137/106, 461

[56] References Cited

U.S. PATENT DOCUMENTS

| | | | |
|---|---|---|---|
| 3,125,324 | 3/1964 | Vivier | 91/420 X |
| 3,411,416 | 11/1968 | Herd et al. | 91/468 X |
| 3,470,792 | 10/1969 | Darling | 91/421 X |
| 3,735,590 | 5/1973 | Bobst | 60/468 |
| 3,771,422 | 11/1973 | Kamman | 91/421 X |
| 3,774,726 | 11/1973 | Bredberg | 91/400 |
| 3,915,068 | 10/1975 | Gassman | 91/421 X |
| 3,942,413 | 3/1976 | Scwary et al. | 60/468 X |
| 4,040,439 | 8/1977 | Uppal | 60/468 X |
| 4,041,841 | 8/1977 | Haskew | 91/421 |
| 4,114,516 | 9/1978 | Johnson | 137/106 X |
| 4,218,957 | 8/1980 | Underwood | 91/421 |

FOREIGN PATENT DOCUMENTS

| | | | |
|---|---|---|---|
| 54-72376 | 6/1979 | Japan | 60/468 |
| 345203 | 3/1931 | United Kingdom | 60/459 |
| 345337 | 3/1931 | United Kingdom | 60/459 |

*Primary Examiner*—Robert E. Garrett
*Assistant Examiner*—George Kapsalas

[57] ABSTRACT

A hydraulic motor has its lube drain connected to the motor return line. A motor seal protector valve has a pilot which responds to pressure in the motor return line. Normally, the valve connects system pressure to the motor inlet. High pressure in the return line causes the pilot to move the valve to block the motor feed line and then to connect the motor feed line to sump. In a preferred embodiment, system pressure is connected to the plot to "lock up" the valve in response to return line overpressurization.

3 Claims, 3 Drawing Figures

MOTOR SEAL PROTECTOR VALVE

BACKGROUND OF THE INVENTION

This invention relates to a hydraulic apparatus, and in particular, to an apparatus for protecting a hydraulic motor from motor outlet overpressurization.

Hydraulic motors are typically lubricated internally by leakage of highly pressurized hydraulic fluid. This lube leakage flow must be drained. One way to drain the lube leakage flow is to provide a separate motor case drain line. However, in situations where the motor is remote from the hydraulic power supply, an additional drain line may be undesirable. Another way to drain the lube flow is to reroute it with the motor return flow from the motor outlet. But, in this case, overpressurization of the return line can cause motor case seal failure. Accordingly, it would be desirable to provide a device for preventing such seal failure while still routing lube drain flow with the motor return flow.

SUMMARY OF THE INVENTION

An object of the present invention is to prevent overpressurization damage to the case seals of a hydraulic motor which has its lube drain flow routed with the motor return flow.

It is a further object of this invention to protect motor case seals by blocking the motor feed line and by connecting the motor inlet to reservoir pressure.

These and other objects are achieved by the present invention which includes a valve which has a pilot which responds to pressure in the motor return line. Normally, the valve connects system pressure to the motor inlet. High pressure in the return line causes the pilot to move the valve to block the motor feed line and then to connect the motor feed line to sump. In a preferred embodiment, system pressure is connected to the pilot to "lock up" the valve in response to return line overpressurization.

DETAILED DESCRIPTION

Figure 1:
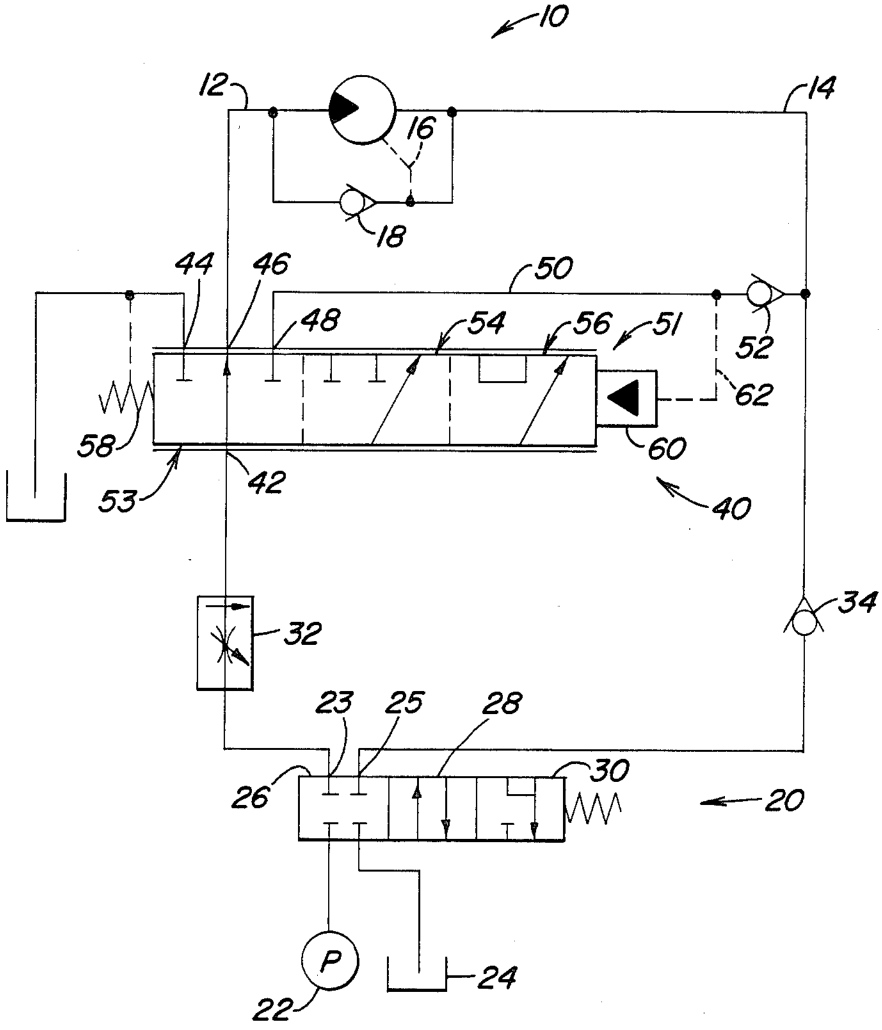
FIG. 1 is a diagram of a hydraulic circuit including a hydraulic motor and the motor seal protector valve of the present invention.

A conventional hydraulic motor 10, such as a unidirectional gear motor or the equivalent, has a feed line 12, a return line 14 and a motor lubrication drain line 16 connected to the return line 14. The motor 10 may also include a check valve 18 between the feed line 12 and the return line 14 to permit the motor to coast to a stop when the feed line 12 is closed.

A selective control valve 20 controls communication between a pump 22, a reservoir 24 and lines 12 and 14. Valve 20 includes a feed port 23 and a return port 25. Valve 20 includes an off position 26, a run position 28 and a float position 30. A pressure-compensated flow control valve 32 is preferably inserted between valve 20 and feed line 12 and a check valve 34 prevents flow from port 25 to return line 14.

The present invention provides for an infinite positioning valve 40. Valve 40 has an inlet 42 communicated with the feed port 23 of valve 20, a first outlet 44 communicated with sump, a second outlet 46 communicated with the motor feed line 12 and a third outlet 48 communicated with the return line 14 via a return passage 50 and check valve 52. Check valve 52 permits only one-way fluid flow from return line 14.

Valve 40 has a valve member or spool 51 movable to a first position 53 wherein inlet 42 is communicated with outlet 46 and wherein outlets 44 and 48 are blocked. Spool 51 also has a second position 54 wherein inlet 42 is communicated with outlet 48 and wherein outlets 44 and 46 are blocked. Spool 51 also has a third position 56 wherein inlet 42 is communicated with outlet 48 and wherein outlets 44 and 46 are communicated with each other. A spring 58 biases the spool to its first position 53. A pressure-operated pilot 60 is operable to move spool 51 out of first position 53 to its second and third positions 54 and 56. A pilot passage 62 connects pilot 60 to passage 50.

With control valve 20 in the run position 28, valve 40 will normally be in the first position 53, as shown. If the return line 14 becomes blocked, then pressure in the return line 14 will increase. This pressure increase is communicated to pilot 60 which moves spool 51 first to position 54 wherein feed line 12 is blocked, thus disconnecting pump pressure from the motor 10. In position 54, the pump pressure is connected to pilot 60 via outlet 48, passage 50 and pilot line 62 so that pilot moves spool 51 to the third position 56 wherein feed line 12 is connected to sump via outlets 46 and 44 and wherein inlet 42 is still connected to outlet 48. This continues pressurization of pilot 60, thus, holding valve member 51 in this third position.

The system remains "locked up" in this state (closing the feed line 12 from pump 22) until the operator moves control valve 20 to its float position 30 whereupon pilot 60 is connected to sump. This permits spring 58 to move spool 51 back to the first position 53 so that the motor 10 can be driven when the control valve 20 is moved back to its run position 28.

Figure 2:
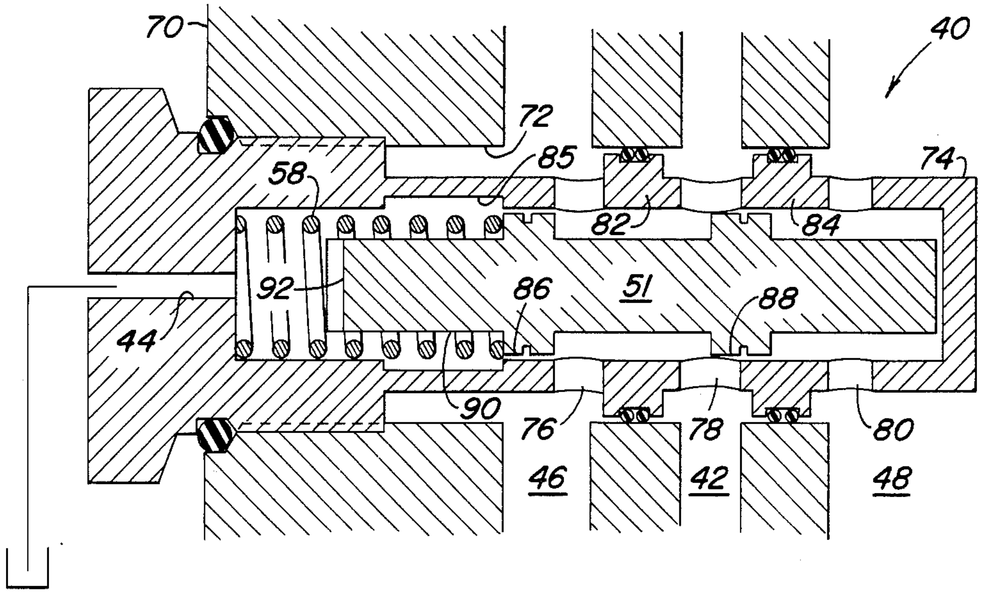
FIG. 2 is a sectional view of the motor protector valve of the present invention.

Turning to FIG. 2, the valve 40 may include a housing 70 having a bore 72 therein communicating with inlet 42 and with outlets 44, 46 and 48. The bore 72 receives a hollow threaded sleeve 74 with radial ports 76, 78 and 80 separated by lands 82, and 84, each having corresponding grooves and O-ring seals therein. Sleeve 74 also has an inner annular groove 85. The valve member 51 is movable within sleeve 74 and has lands 86 and 88 which control communication between ports 76, 78 and 80. Valve member 51 also has stem 90 with a slot 92 in the end thereof. Outlet 44 is formed by an axial passage in an end wall of the sleeve 74.

When the return line 14 is blocked, the valve member moves to the left, viewing FIG. 2, until stem 90 abuts the end wall of sleeve 74 whereupon outlet 46 is communicated with sump via port 76, groove 85, slot 92 and outlet 44.

Figure 3:
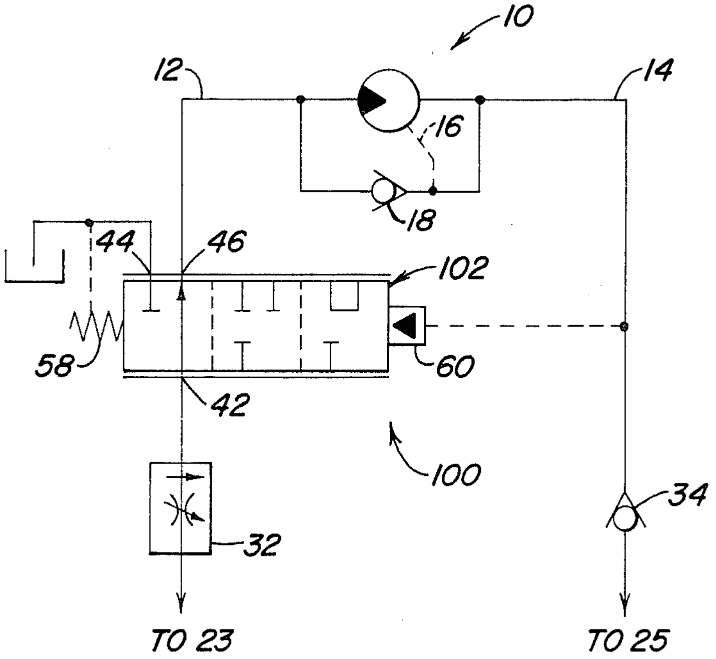
FIG. 3 is a diagram of a hydraulic motor circuit including an alternate motor seal protector valve.

FIG. 3 shows another embodiment of the present invention wherein a simpler valve 100 has an inlet 42 and outlet 44 and 46 similar to valve 40. However, valve 100 differs in that it does not have a third outlet 48, and its valve member 102 has a first position wherein inlet 42 is connected to feed line 12 via outlet 46 and wherein outlet 44 is closed. Valve member 102 also has a second position wherein inlet 42 and outlets 44 and 46 are blocked. Finally, valve member 102 has a third position wherein inlet 42 is blocked and wherein outlets 44 and 46 are connected together, thus connecting feed line 12 to sump.

With valve 100, blockage of return line 14 will cause pilot 60 to move valve member 102 to its third position. However, as soon as pressure in line 14 is reduced, valve member 102 will return to its first position. Thus, valve 100 does not have a "lock up" feature, as does valve 40.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. In a hydraulic system including a source of system pressure, a source of reservoir pressure, and a hydraulic motor having an inlet for receiving system pressure and having an outlet communicated with reservoir pressure, characterized by:

pressure-responsive valve means for blocking communication of system pressure with the motor inlet and for communicating the motor inlet with reservoir pressure in response to an overpressure condition at the motor outlet, the valve means comprising a valve having a valve bore therein, an inlet connecting the valve bore to a system pressure, a first outlet communicating the valve bore with reservoir pressure, a second outlet communicating the valve bore with the motor inlet, a third outlet communicating the valve bore with the motor outlet via a return passage, a valve member movable in the bore to a first position wherein the inlet is connected to the second outlet and the first and third outlets are blocked, to a second position wherein the first and second outlets are blocked and wherein the inlet is connected to the third outlet and to a third position wherein the first and second outlets are connected to each other and wherein the inlet is connected to the third outlet, a spring biased to urge the valve member to the first position, a pressure-operated pilot for moving the valve member to the second and third positions and a pilot line communicating the pilot with the return pressure.

2. The invention of claim 1, wherein:

the first outlet is comprised of a passage extending axially through the valve housing from one end of the valve bore.

3. The invention of claim 2, wherein:

the spring engages the valve member and a wall of the housing at the one end of the valve bore.

* * * * *